July 7, 1964 J. A. GEIKLER, JR., ETAL 3,140,455

STRIPLINE VARIABLE POWER DIVIDER

Filed June 7, 1962 3 Sheets-Sheet 1

INVENTORS
JOHN A. GEIKLER, JR.
TOMMY S. WEAVER
BY
H. H. Losche
Paul S. Collignon
ATT'YS.

INVENTORS
JOHN A. GEIKLER, JR.
TOMMY S. WEAVER
BY
H. H. Losche
Paul S. Collignon
ATT'YS.

STRIPLINE VARIABLE POWER DIVIDER

Filed June 7, 1962 3 Sheets-Sheet 3

INVENTORS
JOHN A. GEIKLER, JR.
TOMMY S. WEAVER
BY
[signatures]
ATT'YS.

United States Patent Office 3,140,455

Patented July 7, 1964

3,140,455

STRIPLINE VARIABLE POWER DIVIDER

John A. Geikler, Jr., Linthicum Heights, and Tommy S. Weaver, Arnold, Md., assignors, by mesne assignments, to the United States of America as represented by the Secretary of the Navy Filed June 7, 1962, Ser. No. 200,896
2 Claims. (Cl. 333—6)

The present invention relates to a power divider for a coaxial cable system, and more particularly to a power divider that will divide the total power of an input source into any proportion to be delivered to two outputs.

Various devices, particularly in the waveguide art, have been employed to divide power from a single input source into two or more outputs. In one type of power divider shown in U.S. Patent 2,990,523, a printed circuit board is provided, a portion of which forms a switch rotor and the whole of which is positioned between two conducting planes to form a tri-plate microwave conducting path. The circuitry on the printed circuit board and rotor is such that in one position of the rotor a fifty ohm line leads from an input to one output with constant impedance characteristics. In another position of the rotor, the input is connected to all three outputs through a printed circuit which acts as an impedance matching transformer.

The structure of the power divider described in the above-mentioned patent operates as a switch to enable the input connector to be electrically connected to one output connector in one switch position, and in another switch position the input connector is electrically connected to three output connectors. While this switch does provide a desired function, it cannot perform the functions desired of the power divider of the present invention, which function is to proportionally divide, in any desired ratio, the input power into two output arms.

The device of the present invention is comprised of three layers of stripline board, the bottom layer of which contains a circuit. This circuit on the bottom layer is comprised of a first conductive area that is connected to an input connector and to one output connector, and a second conductive area that is connected to a second output connector. Each conductive area has a tapered portion. The tapered portion on said first conductive area is contiguous to the tapered portion on said second conductive area but separated by a narrow gap.

The middle layer of stripline board is comprised of two outside spacers and a slider therebetween. A small conductive area is provided in the middle portion of the slider and is adaptable for contacting the first and second conductive areas on the bottom layer. As the slider is moved along the tapered areas on the bottom layer, the impedance in the lines going to the output connectors is varied and the proportion of the total power delivered to the output connectors in dependent upon the relative line impedances.

It is therefore a general object of the present invention to provide an improved device for use as a power divider for microwave energy.

Another object of the present invention is to provide a power divider for varying the percentage of power delivered into two output arms from a single input source.

Other objects and advantages of the present invention will be readily appreciated as the same becomes better understood by reference to the following detailed description when considered in connection with the accompanying drawings wherein.

Figure 8:
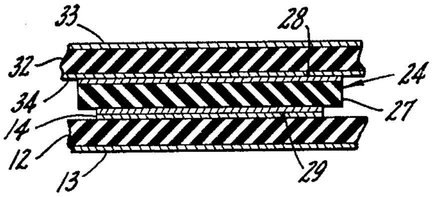
FIGURE 8 is a sectional view taken on line 8—8 of FIGURE 1.

Referring first to FIGURE 8 of the drawing, it can be seen that the configuration of the stripline of the present invention consists of strip conductors supported on dielectric spacers. The bottom dielectric spacer is provided with a ground plane on the outer surface and the top dielectric, which forms the cover of the assembly, is provided with a ground plane on each side of the dielectric material. The ground plane, by way of example, might be a sheet of thin metal that is bonded to the surface of the dielectric.

Figures 1, 2, 3:
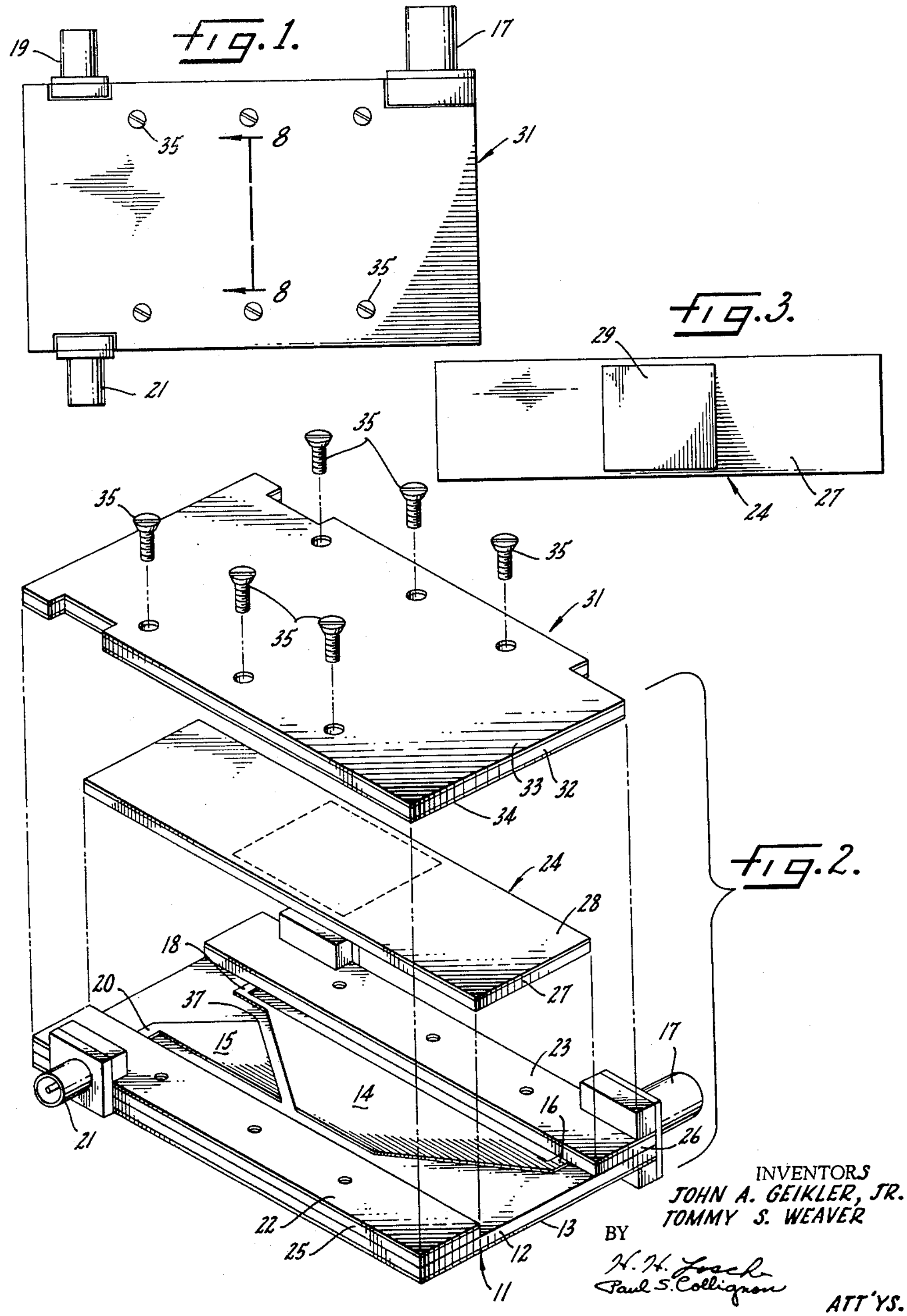
FIGURE 1 is a top plan view of a preferred embodiment of the present invention.
FIGURE 2 is an exploded view of the embodiment shown in FIGURE 1 of the drawing.
FIGURE 3 is a plan view showing the bottom side of a slider.

Referring now to FIGURES 1 through 3 of the drawings, there is shown an embodiment of a variable power divider having three layers. The bottom layer 11 is comprised of a dielectric plate 12 that has a metal ground plate 13 attached thereto on the bottom side, and strip conductors 14 and 15 are attached on the upper side. Strip conductor 14 is substantially trapezoidal in configuration and is comprised of a thin layer of metal that is attached, as by bonding, to the dielectric plate 12. A connecting strip 16 is provided on one end of strip conductor 14 and this strip is electrically connected to the coaxial inner conductor of connector 17. A second connecting strip 18 is provided on the opposite end of strip conductor 14, and this strip is electrically connected to the coaxial inner conductor of connector 19.

Strip conductor 15 is of substantially triangular configuration and is likewise comprised of a thin layer of metal that is attached, as by bonding, to the dielectric plate 12. A connecting strip 20 is provided at one corner of the triangular pattern 15, and this strip is electrically connected to the coaxial inner conductor of connector 21. As particularly shown in FIGURE 2 of the drawings, the triangular strip conductor 15 is in close proximity to the trapezoidal strip conductor 14 with one side of the triangular strip conductor 15 being adjacent to and parallel with one side of the trapezoidal strip conductor 14. By way of example, the layer 11 might be made from a copper-clad base material, which is widely known and used in the printed wiring board art, and the strip conductors 14 and 15 might be formed by etching or machining away the undesired portion of the clad material.

The second or middle layer of the embodiment shown in the drawings is comprised of spacers 22 and 23, and a slider 24 that is guided between spacers 22 and 23. Spacers 22 and 23 are each comprised of an insulating material 25 and 26, respectively, and a ground plane is provided on the top of each spacer. Slider 24 is likewise comprised of a dielectric 27 and a ground plane 28. As best shown by FIGURE 3 of the drawings, slider 24 is provided with a substantially square conductor 29 that is attached, as by bonding, to the bottom side of slider 24. Conductor 29 is adaptable for contacting trapezoidal strip conductor 14 and triangular strip conductor 15 that are provided on bottom layer 11.

The third or top layer 31 of the embodiment shown in the drawings provides a cover and also retains slider 24 in contact with the bottom layer 11. Top layer 31 is comprised of a dielectric plate 32 and ground plates 33 and 34 on each side thereof. As the top layer 31 has ground planes on both sides, it would be feasible to replace the laminated cover with a solid metal sheet. The three layers are retained by screws 35 that can be threaded into tapped holes in bottom layer 11.

Figure 4:
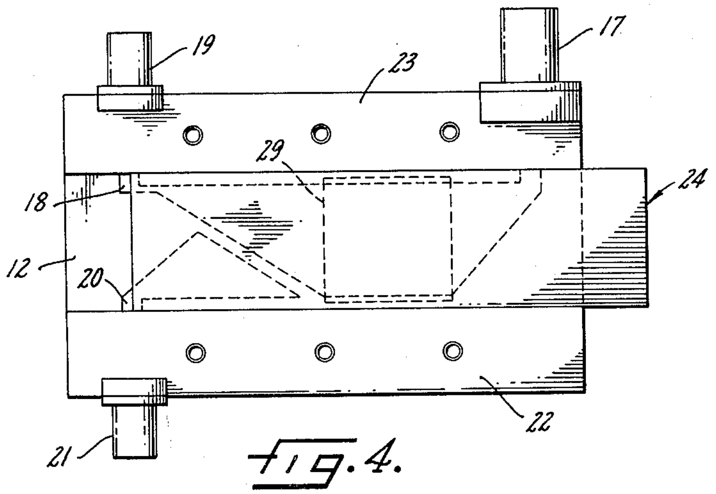
FIGURE 4 is a top plan view with the cover plate removed and showing a slider in a first position.
Figure 6:
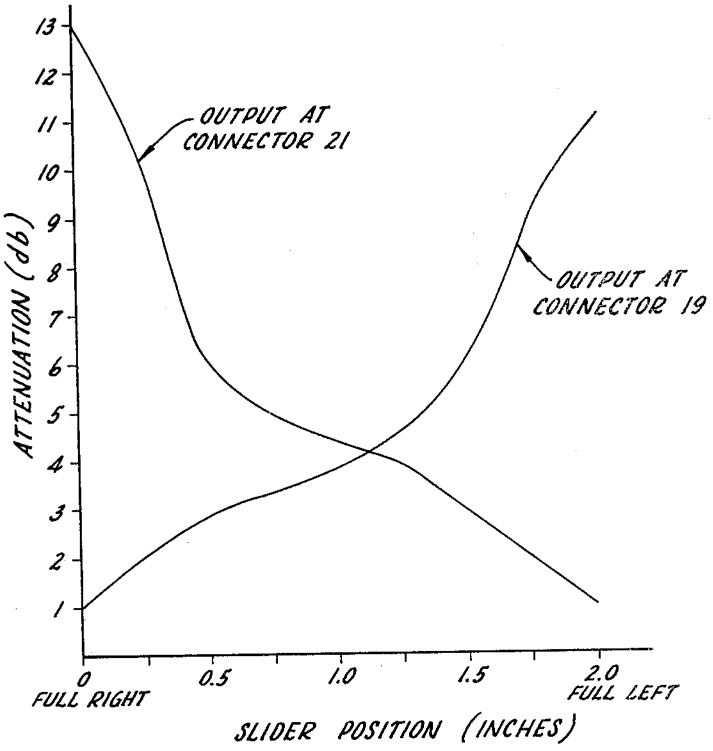
FIGURE 6 is a graphical view showing attenuation at various slider positions.

In operation, connector 17 is connected to a signal source and connectors 19 and 21 are connected to appropriate power output lines. By way of example, the signal might enter at connector 17 from a 50 ohm line and the impedance is then transformed in the tapered portion of circuit 14 to a low impedance line (approximately 10 ohms). When slider 24 is in its full right position, as shown in FIGURE 4 of the drawings, the square conductor 29 on slider 24 lies wholly on the low impedance line of conductor 14 and consequently there is no coupling to the output connector 21 and all the power, except leakage, goes to connector 19. FIGURE 6 shows the relationship of the outputs at connectors 19 and 21 for various positions of slider 24. It can be seen that when slider 24 is at a full right position the attenuation between connectors 17 and 19 is at a minimum value (about 1 db). When the slider is at a full left position, the attenuation between connectors 17 and 21 is at a minimum value (about 1 db).

Figure 5:
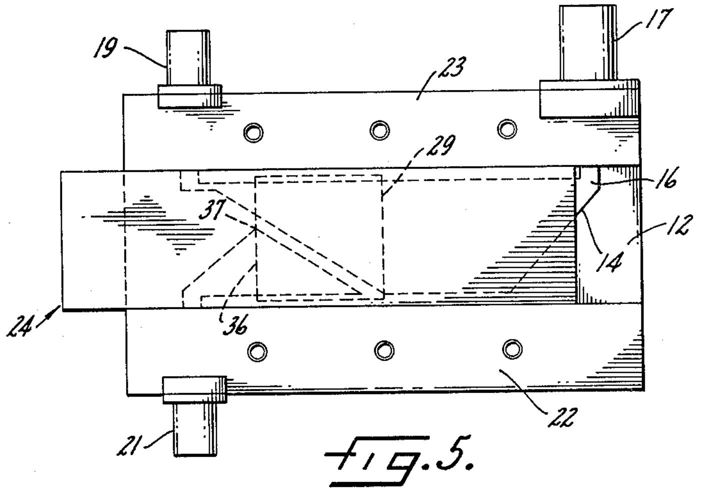
FIGURE 5 is a top plan view similar to the view of FIGURE 4 of the drawing only showing a slider in another position.

When slider 24 is in its full left position, as shown in FIGURE 5 of the drawings, the leading edge 36 of conductor 29 coincides with the apex 37 of triangular conductor 15. When slider 24 is in this position, the low impedance line is extended, and the line going to connector 21 provides a low impedance path (about 15 ohms) and the line to connector 19 is a high impedance (about 100 ohms). Accordingly, in this position, that is when slider 24 is in its full left position, most of the input power is delivered to output connector 21. At any point between the full left position and the full right position, the proportion of the total power delivered to each connector 19 and 21 is dependent upon the relative line impedances. The line impedances at any position are such that the parallel combination of these impedances is equal to the characteristic impedance of the low impedance line.

Figure 7:
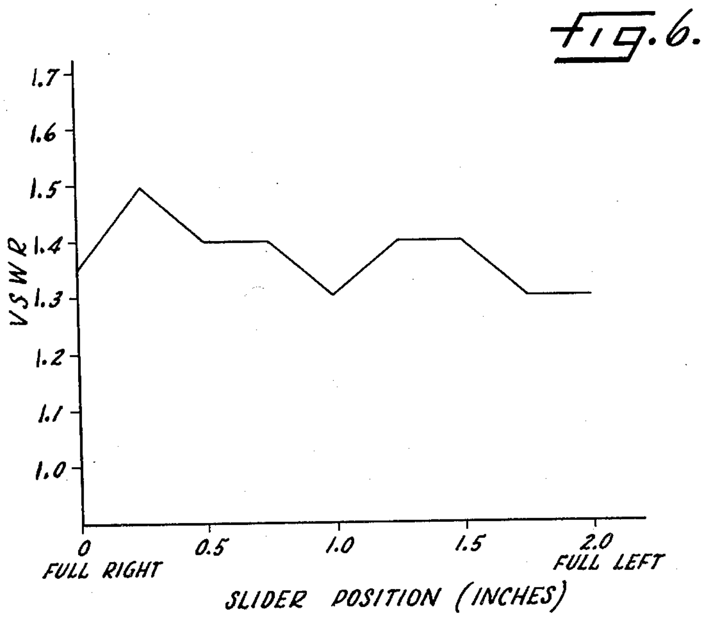
FIGURE 7 is a graphical view showing voltage standing wave ratios for various slider positions.

Referring now to FIGURE 7 of the drawings, there is shown a graph of test results of a device built according to the teachings of the present invention. It can be seen that the voltage standing wave ratio (VSWR) for various slider positions is less than 1.5.

It can thus be seen that the present invention provides an improved device for varying the percentage of power delivered into two separate arms from a single source.

Obviously many modifications and variations of the present invention are possible in the light of the above teachings. It is therefore to be understood that within the scope of the appended claims, the invention may be practiced otherwise than as specifically described.

What is claimed is:

1. A variable power divider for microwave energy comprising:
   (*a*) a first dielectric plate having a ground plane on one side and first and second coplanar microwave conductors on the opposite side, said first microwave conductor being of a trapezoidal configuration and said second microwave conductor being of a triangular configuration, one side of said triangular configuration being juxtaposed and parallel to one side of said trapezoidal configuration,
   (*b*) an input connector connected to said first microwave conductor,
   (*c*) a first output connector connected to said first microwave conductor and a second output connector connected to said second microwave conductor,
   (*d*) a second dielectric plate having first and second ground planes on each side thereof and spaced above and parallel to said first dielectric plate, and
   (*e*) a slider slidably positioned between said first and second dielectric plates, said slider having a microwave conductor thereon selectively engageable with either said first microwave conductor or with both said first and second microwave conductors.

2. A stripline for use as a variable power divider comprising:
   (*a*) a first layer comprised of a dielectric plate having a ground plate on one side and first and second microwave conductors on the opposite side, said first microwave conductor being of a trapezoidal configuration and said second microwave conductor being of a triangular configuration, one side of said triangular configuration being juxtaposed and parallel to one side of said trapezoidal configuration,
   (*b*) a second layer comprised of first and second spaced parallel spacers mounted on said first layer and having a slider slidably positioned between said first and second spaced parallel spacers, said slider having a microwave conductor thereon selectively engageable with either said first microwave conductor or with both said first and second microwave conductors, and
   (*c*) a third layer mounted on said second layer, said third layer being comprised of a dielectric plate having first and second ground planes on each side thereof.

References Cited in the file of this patent

UNITED STATES PATENTS

| | | |
|---|---|---|
| 2,922,123 | Cohn | Jan. 19, 1960 |
| 2,946,024 | Mills | July 19, 1960 |
| 2,990,523 | Jacques | June 27, 1961 |
| 3,002,165 | Ayer et al. | Sept. 26, 1961 |